United States Patent
Kingsbury et al.

(10) Patent No.: US 6,629,152 B2
(45) Date of Patent: Sep. 30, 2003

(54) MESSAGE PASSING USING SHARED MEMORY OF A COMPUTER

(75) Inventors: Brent A. Kingsbury, Beaverton, OR (US); Jean-Marie Christian Sulmont, Portland, OR (US); Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/107,094

(22) Filed: Jun. 29, 1998

(65) Prior Publication Data

US 2003/0061395 A1 Mar. 27, 2003

(51) Int. Cl.[7] .................................................. G06F 9/46
(52) U.S. Cl. ..................................................... 709/313
(58) Field of Search ........................ 709/214, 310–315, 709/216, 244, 213; 711/167, 111; 713/1; 710/5; 707/100–104.1

(56) References Cited

U.S. PATENT DOCUMENTS

| | | | | |
|---|---|---|---|---|
| 5,230,051 A | * | 7/1993 | Quan | 709/312 |
| 5,357,612 A | * | 10/1994 | Alaiwan | 709/216 |
| 5,434,975 A | * | 7/1995 | Allen | 709/300 |
| 5,465,329 A | * | 11/1995 | Whisler | 711/111 |
| 5,513,328 A | * | 4/1996 | Christofferson | 709/244 |
| 5,617,537 A | * | 4/1997 | Yamada et al. | 709/214 |
| 5,841,973 A | * | 11/1998 | Kessler et al. | 709/250 |
| 5,900,020 A | * | 5/1999 | Safranek et al. | 711/167 |
| 5,901,326 A | * | 5/1999 | Gildea et al. | 710/5 |
| 5,938,765 A | * | 8/1999 | Dove et al. | 713/1 |
| 6,029,205 A | * | 2/2000 | Alferness et al. | 709/300 |
| 6,182,152 B1 | * | 1/2001 | Jonkers | 709/310 |

OTHER PUBLICATIONS

"Interprocess Communications," *UNIX Internals*, by Uresh Vahalia, pp. 149–186 (1996).
"Synchronization and Multiprocessors," *UNIX Internals*, by Uresh Vahalia, pp. 187–219 (1996).
"The SVR4 VM Architecture," *UNIX Internals*, by Uresh Vahalia, pp. 437–440 (1996).

* cited by examiner

*Primary Examiner*—St. John Courtenay, III
*Assistant Examiner*—Van H. Nguyen
(74) *Attorney, Agent, or Firm*—Klarquist Campbell Leigh & Whinston; Michael Dryja

(57) ABSTRACT

A lock-free mechanism is provided for successfully passing messages between processes even if a process is preempted while sending or receiving a message. Messages are communicated between processes using a mailbox data structure stored in memory shared by the processes, without the use of locks or other mutual exclusion entities that would otherwise limit concurrent delivery and receipt of messages placed in the data structure. The data structure in the illustrative embodiment includes one or more message slots for storing messages placed in the data structure and a number of state variables for inserting messages into and removing messages from the message slots. A process sends or retrieves messages by manipulating the state variables using indivisible atomic operations. This ensures that a process cannot be preempted from message passing until it finishes executing the atomic instruction. The method and mechanism have particular value in distributed shared memory (DSM) and non-uniform memory access (NUMA) machines.

17 Claims, 5 Drawing Sheets

MESSAGE PASSING USING SHARED MEMORY OF A COMPUTER

FIELD OF THE INVENTION

This invention relates generally to communication mechanisms for computers. More particularly, this invention relates to a communication mechanism for shared memory multiprocessor computers such as a NUMA (non-uniform memory access) or UMA (uniform memory access) machine. The invention, however, also has applicability in single processor computers as a communication mechanism between multiple processes that can share the physical memory of the computer.

BACKGROUND OF THE INVENTION

Multiprocessors are computers that contain multiple processors that can execute multiple parts of a computer program or multiple distinct programs simultaneously, in a manner known as parallel computing. In general, multiprocessor computers execute multithreaded or single-threaded programs faster than conventional single processor computers, such as personal computers (PCs), that must execute programs sequentially. The actual performance advantage is a function of a number of factors, including the degree to which parts of a program can be executed in parallel and the architecture of the particular multiprocessor at hand.

Multiprocessors may be characterized as tightly-coupled or loosely-coupled machines. A loosely-coupled machine is composed of multiple independent processor/memory systems or "nodes." Access by one node to the memory of another requires that an explicit (program-initiated) message passing operation be accomplished. The physical address space of a loosely-coupled machine consists of multiple private address spaces (one such space per node) that are logically disjoint and cannot be directly addressed by a remote processor. In such machines, a processor can thus only directly access the memory of the node in which the processor resides. Loosely-coupled machines are sometimes referred to as message-passing machines or massively-parallel processors (MPPs). Programs for these machines are referred to as message-passing programs. In a tightly-coupled machine, in contrast, there is only one logical address space. All memory can be directly referenced by any program, subject to memory protection policies enforced by the machine's operating system.

Tightly-coupled machines can be subdivided into two groups. Multiprocessors in which the physical memory is centralized and shared are called uniform memory access (UMA) machines because all memory accesses have the same performance cost. Multiprocessors in which the shared memory is distributed among separate nodes are called distributed shared memory (DSM) machines. The term shared memory refers to the fact that the physical memory of the machine is shared; that is, all processors (one or many) can directly access the entire shared physical memory of the machine without having to perform any message operations like those of loosely-coupled machines. In a loosely-coupled machine, in contrast, a processor on a node must use specialized mechanisms to copy data from a remote node to its own local memory or to the remote node from its own local memory. This is because the only memory a processor on a node in such a machine can directly access is its own local memory. DSM machines are also called NUMA (non-uniform memory access) machines, since the access time depends on the location of a data word in memory. Tightly-coupled machines are also called shared memory machines.

Message-passing machines (which have multiple separate physical address spaces, one per node and accessible only by processors on that node) and shared memory machines (which have a shared physical memory directly addressable by all processors in the machine) have different communication mechanisms. For a shared memory machine, the shared physical memory can be used to communicate data implicitly via processor instructions that write and read the shared memory; hence the name "shared memory" for such machines. For a message-passing machine with its multiple separate per-node physical address spaces, communication of data is done by explicitly passing messages among the processors. For example, if one processor wants to access or operate on data in another node's memory, it can send a message to request the data or to perform some operation on the data. In such cases, the message can be thought of as a remote procedure call (RPC). When the destination node receives the message, either by polling for it or via an interrupt, it performs the operation or access on behalf of the requesting processor on the requesting node and returns the results with a reply message.

Message passing machines have not been as commercially successful as shared memory machines for a number of reasons, including the time they require to pass large amounts of shared data from one node to another. Each message can only carry a limited amount of data, so sending a large amount of shared data can take many messages. In addition, the sending of messages between nodes in a message-passing machine requires entry into the operating system to program the message-passing hardware associated with each node. In return for this operating system overhead, however, a message-passing architecture avoids the need to keep a single shared memory image transparently coherent across all processors in the machine. Instead, the explicit message-passing calls that a message-passing machine requires for communication between its constituent nodes effectively tells the memory access hardware of a node to be careful about memory coherency. This notice occurs as the hardware sends or receives a message concurrently with the processor(s) on that node accessing the node's memory.

This memory coherency is a requirement in a shared memory architecture in order to share data validly among the processors. Programs running on a shared memory machine rely on the underlying hardware to keep a coherent image of memory at all times, without special message-passing operations. If, for example, two or more processors (or threads or processes, etc. running on these processors) on a shared memory machine wish to communicate via shared memory, they can easily do so by arranging to share access to the same physical memory. Simple processor read and write operations to the memory so shared then allow the communication to directly occur. Consequently, it is possible to make a message-passing application, originally written for a message-passing machine, run on a shared memory machine by replacing its message-passing calls with a software layer that re-implements via shared memory the original message-passing layer of the application.

In the case of DSM machines, application software can often "hide" or greatly reduce the performance impact of having non-uniform access to different portions of the machine's physical memory. The software partitions itself across the different nodes and then communicates data between the nodes using a message-passing programming model that minimizes cross-node memory traffic. In this way, the software is able to maximize the performance of a DSM machine by using the transparent nature of the globally shared memory model to implement a light weight message-passing layer.

To support this light weight message-passing layer atop shared memory, however, there must be a means by which all of the cooperating communicating "agents" (be they processors, threads running on processors, processes running on processors, etc.), are able to tell when a message has been completely sent (versus a partial message that is still being delivered). This means must also allow messages so sent to be received, and it must allow for the maximum possible concurrency of the senders and receivers. Traditional means include the use of synchronization mechanisms such as the acquisition of a mutual exclusion lock or "mutex" to guard the state of the shared memory in which the communication is occurring. For instance, a sending thread (or a process or equivalents thereof) acquires a mutex, deposits its message, and then releases the mutex in the case where multiple concurrent threads are communicating by using data structures in the same shared memory. Similarly, a receiving thread acquires the same mutex to check for the presence of messages in the shared memory. If one exists, the thread reads and consumes the message while holding the mutex. By doing so, the receiving thread prevents sending threads, which may be attempting concurrently to send messages to the shared memory, from interfering with the act of receiving.

The acquisition and holding of such mutexes, unfortunately, has several disadvantages. It limits the possible concurrency of message-passing software. It also naturally imposes overhead in the form of operating system calls to obtain and release such mutexes. Even worse, it does not handle preemption well. A first process (or thread) may find itself preempted by a second process (or thread) while holding the mutex that guards the shared memory in which messages are being passed. The mutex remains held while the first process is preempted, preventing other processes from accessing this shared memory. If the second process finds itself needing to acquire the mutex held by the preempted first process, then the second process is blocked until the first process is resumed and run to the point of releasing the mutex. If the two processes are running at different fixed priorities, and the operating system strictly enforces priority in its scheduling decisions, then deadlock can occur if the priority of the second process is higher than the first. To avoid this deadlock in the use of mutexes to guard shared data, the operating system must implement complex priority-inheritance mechanisms in which the first process is temporarily resumed with an elevated priority that allows it to complete its work to the point of releasing the mutex to the second process.

An objective of the invention, therefore, is to provide an improved communication mechanism for passing messages on a uniprocessor machine or on a shared memory multiprocessor such as a NUMA or UMA machine. Another objective is to provide a lock-free mechanism for successfully passing messages between processes even if a process is preempted while sending or receiving a message. Yet another objective of the invention is to provide such a mechanism that, where appropriate, adapts existing-message passing software to run on a shared memory machine.

For further information on multiprocessors and their different communication mechanisms, a number of works are instructive, including *Computer Architecture: A Quantitative Approach* ($2^{nd}$ Ed. 1996), by D. Patterson and J. Hennessy, and *UNIX Internals: The New Frontier* (1996), by Uresh Vahalia, both of which are incorporated by reference.

SUMMARY OF THE INVENTION

In accordance with the invention, a method for communicating messages between processes via memory of a computer comprises providing a mailbox data structure for a second process in memory accessible to a first process and a second process, the data structure having one or more message slots for storing messages sent to the data structure. For sending messages, the data structure includes an availability indicator for indicating if a message slot is available for receiving a message. Messages are sent from the first process to the second process via the mailbox data structure by obtaining, in an atomic operation, the present value of the availability indicator and changing the present value to a new value; determining from the present value of the indicator if a message slot is available for receiving a message; and sending the message to the data structure if a message slot is available. For receiving messages, the data structure includes a presence indicator for indicating if a message is present in a message slot. A message is received by the second process determining from the presence indicator that a message is present in a message slot; removing the message from the slot; and changing, in an atomic operation, the value of the presence indicator to indicate that the message is no longer present in the message slot.

In one aspect of the invention, the data structure may include a set of message slots storing messages sent to the data structure and a set of indicators manipulatable by an atomic operation for inserting messages into and removing messages from the message slots. The indicators may be a set of state variables comprising a first variable indicating if a message slot is available for storing a message; a second variable indicating a location of an available slot; a third variable indicating whether a sent message has been received in a message slot; and a fourth variable indicating a location of a slot containing a received message.

In another aspect of the invention, it may be implemented on a multiprocessor such as distributed shared memory machine with multiple nodes. A mailbox data structure is provided on each node to allow the nodes to pass messages to each other, using existing message-passing software adapted to run on such a machine.

DETAILED DESCRIPTION OF AN ILLUSTRATIVE EMBODIMENT

The invention is presently implemented within the particular multiprocessor computer having distributed shared memory shown and described herein. It should be recognized, however, that the invention is not limited to this implementation but can be applied in other computers such as UMA machines and single processor machines. Moreover, the term "process" is used broadly herein to mean any coherent sequence of steps undertaken by a computer program and includes without limitation a process, thread, kernel thread, lightweight process, thread of kernel execution, etc. and equivalents thereof.

Figure 1:
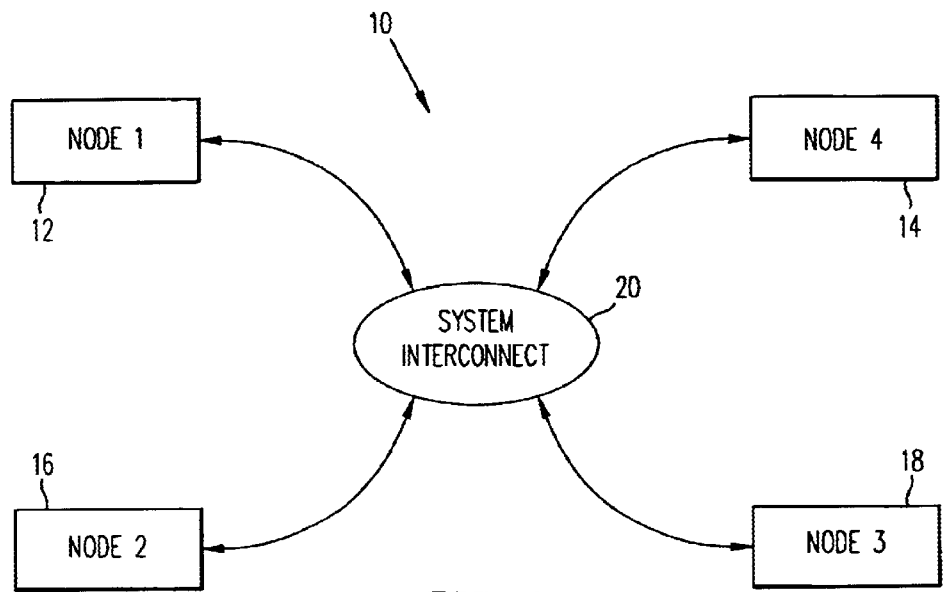
FIG. 1 is a block diagram of a multiprocessor computer having multiple nodes, with a system interconnect coupling the nodes together.

FIG. 1 is a block diagram of a multiprocessor computer system 10 that uses a computer architecture based on Distributed-Shared Memory (DSM). This type of computer system is also known as a NUMA machine. Four nodes 12, 14, 16, and 18 are shown connected by a system interconnect 20 (i.e., a network) that permits any node to communicate with any other node. The purpose of system interconnect 20 is to allow processors in any node to directly and transparently access the physical memory that resides in any other node. System interconnect 20 is a switch-based network that uses the Scalable Coherent Interface (SCI) interconnection mechanism. SCI is an IEEE-approved standard that is well documented in a number of publications including *IEEE Std 1596-1992* Aug. 2, 1993) and *Multiprocessor Interconnection Using SCI*, a Master Thesis by Ivan Tving, DTH ID-E 579 (1994), both of which are incorporated by reference.

The physical links of interconnect 20 provide high bandwidth and low latency and are scalable to allow for the addition of more nodes. Links that meet these requirements presently include point-to-point interconnects with a data throughput of one gigabyte/second or greater. The links can be configured in any number of suitable ways for connecting nodes 12, 14, 16, and 18, such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, *Computer Sciences Technical Report* #1058, University of Wisconsin—Madison, which is incorporated by reference.

Node Overview

Figure 2:
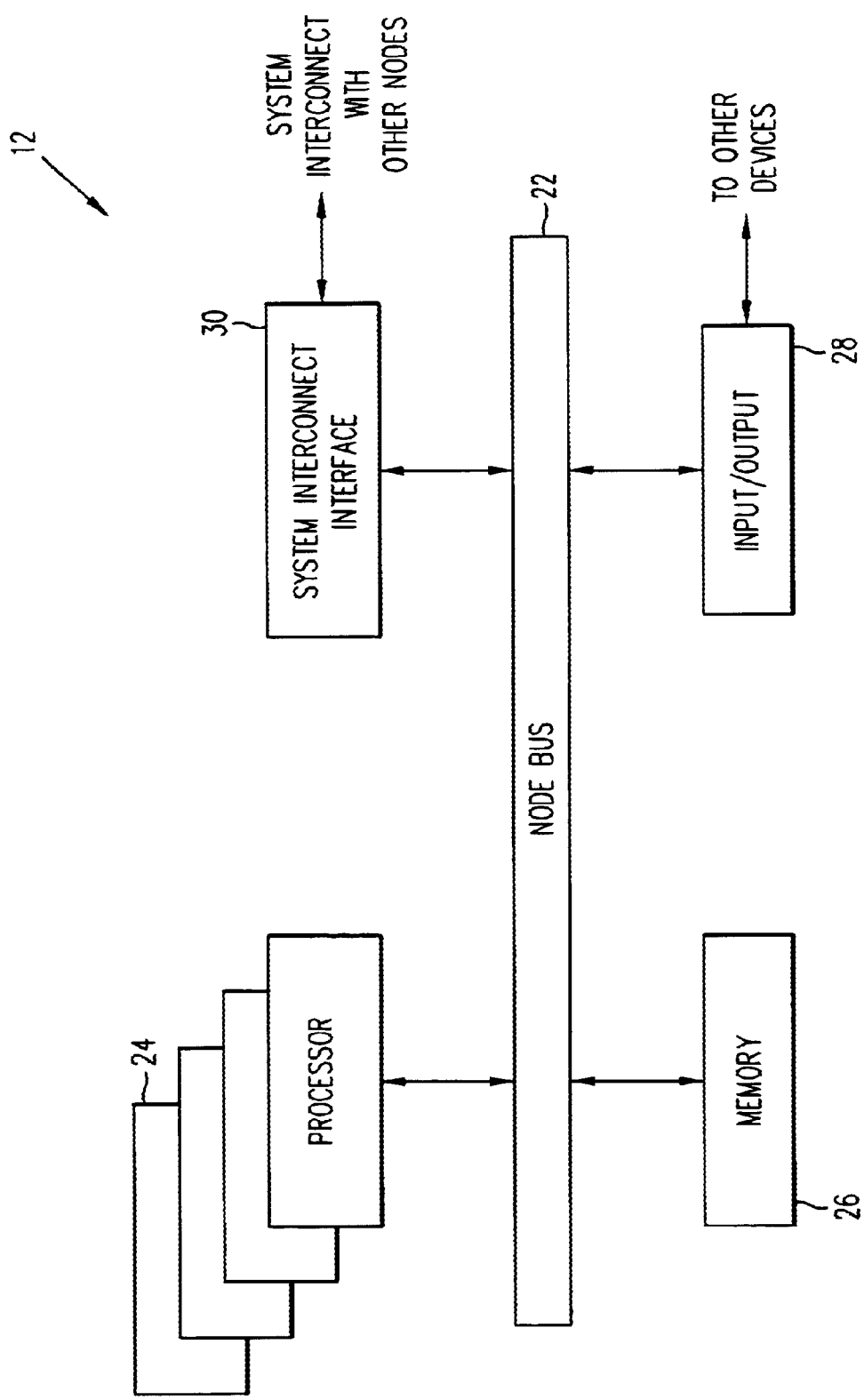
FIG. 2 is a block diagram of one of the nodes of the multiprocessor computer of FIG. 1.

A block diagram of node 12 on system 10 is shown in FIG. 2. The node includes a conventional symmetric multiprocessor (SMP) node bus 22 for connecting multiple data processors 24 to local memory 26. For clarity, nodes 12, 14, 16, and 18 may be referred to as home nodes or remote nodes. A home node is one whose local memory stores a memory block of interest (i.e., the physical address of the memory block falls within the address range supported by the local memory or cache); all of the other nodes are then remote nodes with respect to that memory block. Additionally, a node may be a requesting node or a responding node. A requesting node is one requesting data; a responding node is one furnishing such data. Input/output (I/O) device 28, which is also connected to bus 22, connects the node to devices outside computer system 10 for communicating information between the computer system and the outside world. I/O device 28 may be of conventional design and includes means for connecting the node (and hence system 10) to personal computers, local area networks, etc., that wish to utilize the power of the computer system. The I/O device 28 may also allow for connection to peripheral devices, such as floppy disks, hard disks, CD-ROMs etc. To connect node 12 to the other nodes in the system, the node includes a system interconnect interface 30. The system interconnect interface forms part of interconnect 20 along with the physical links between nodes and the same devices on the other nodes of the computer system 10. In the present embodiment, interface 30 is constructed to implement the SCI standard for data communication between the nodes, allowing a processor on one node to transparently access memory physically located on another node. The interface 30 also contains a remote cache in the present embodiment, although the remote cache could also be separate from the system interconnect interface.

Software Architecture

Figure 3:
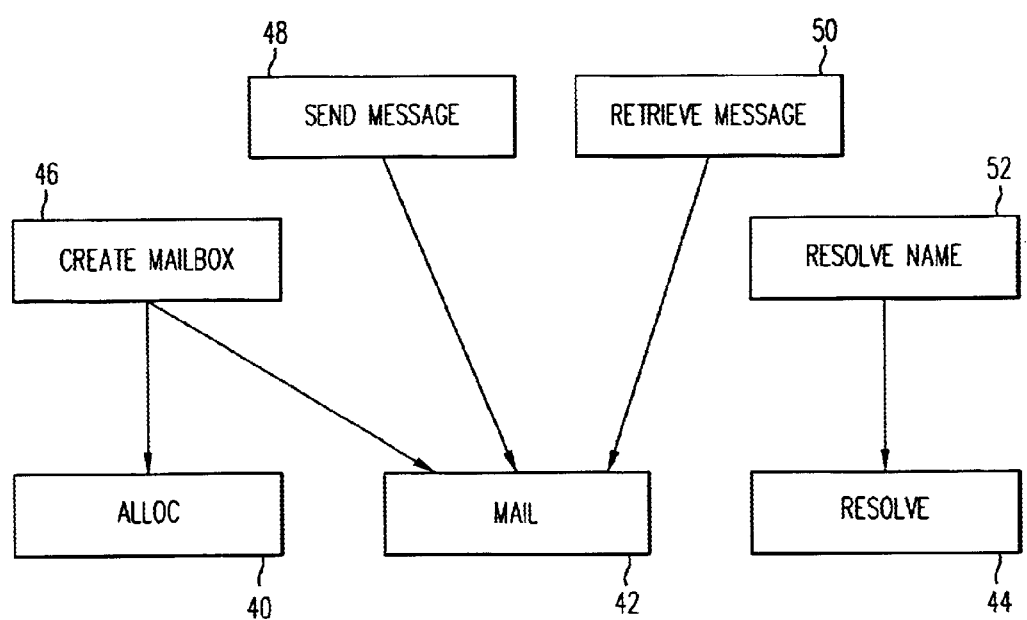
FIG. 3 is an architectural diagram of the software components in the illustrative embodiment of the invention.

FIG. 3 is an architectural diagram of the software components in the illustrative embodiment of the invention. Blocks 40, 42, and 44 represent different modules of code (or "text") stored in the memory of system 10 that define user-level functions. Block 40 represents the code (typically written as functions) for allocating physical memory to a process. Block 42 represents the code for creating and initializing "mailbox" data structures (each mailbox of which serves as a receiving area for messages being sent to a specific recipient process). Block 42 also represents the code for sending messages by placing messages into these mailbox data structures and retrieving messages by reading out previously sent messages from these data structures. Block 44 represents the code for resolving the name of a mailbox data structure in those embodiments where such is required. Blocks 46, 48, 50, and 52 represent function calls made to the code within these modules for creating, sending, and receiving messages and for resolving names of mailbox data structures. These function calls are available to any process executing within system 10 for passing messages to other processes. The sending and destination processes may be running on the same or different nodes. For systems which contain message-passing software, an identical instance of this software is typically stored on each of the nodes of system 10 and contains or otherwise has access to these function calls. The replication of this software across all nodes, however, is not necessary. All nodes in a DSM machine such as system 10 are capable of accessing a single copy of this software, although with a performance penalty for those nodes upon which the message-passing software is not physically present. The replication of the message-passing software across all nodes merely serves to eliminate the remote memory references when fetching the machine instructions that embody the message-passing algorithms for a DSM machine, hence improving the performance of these algorithms.

Creating a Mailbox

A mailbox data structure is created in accordance with the invention for receiving messages. A process receives messages by being associated with a mailbox data structure. The data structure is created and stored in memory by calls to functions. In the illustrative embodiment, for example, such functions are found within block 40, which represents a NUMA-aware memory allocation module "Alloc." This module can allocate shared memory for a mailbox data structure on a predetermined node for the calling process if desired.

Figure 4:
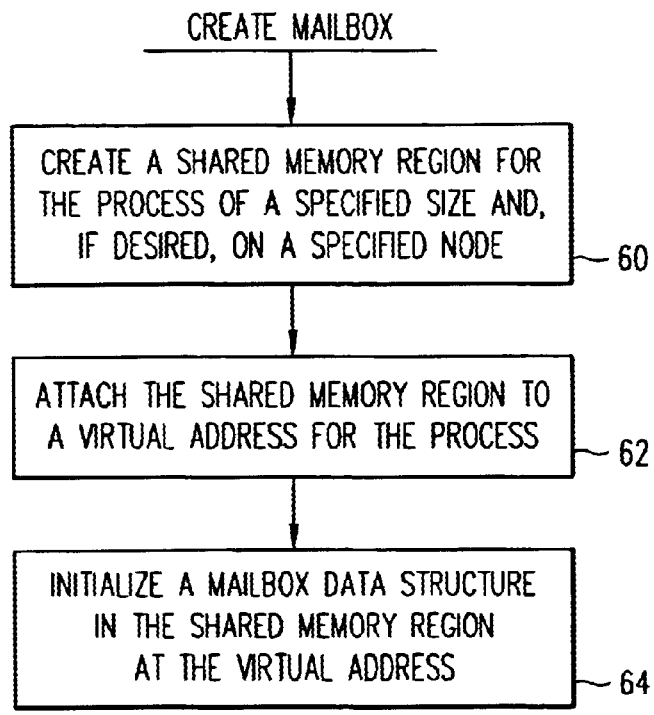
FIG. 4 is a flowchart of a method for creating a mailbox data structure in accordance with the invention.

FIG. 4 is a flowchart that illustrates how a mailbox data structure is created in the illustrative embodiment. First, a process makes the appropriate function call to block 40 to allocate a shared memory region for the data structure (step 60). This region is a portion of physical memory that is shared by multiple processes. The process has the option of specifying on which node the physical memory for the data structure will be allocated. Otherwise, the process must accept whatever node the operating system chooses to allocate the physical memory from. Through another call the process attaches the shared memory region to a suitable virtual address range within its own address space (step 62). Through yet another call the process then initializes a mailbox structure in the shared memory region at the specified virtual address (step 64).

It should be understood that this is only one of a number of ways for creating a mailbox data structure in accordance with the invention. The first two function calls described relate to the shmget and shmat functions found in the UNIX operating system. The same result may be accomplished through file mapping by mapping multiple processes to the same physical page(s) in memory using the mmap-type functions and system calls.

Figure 5:
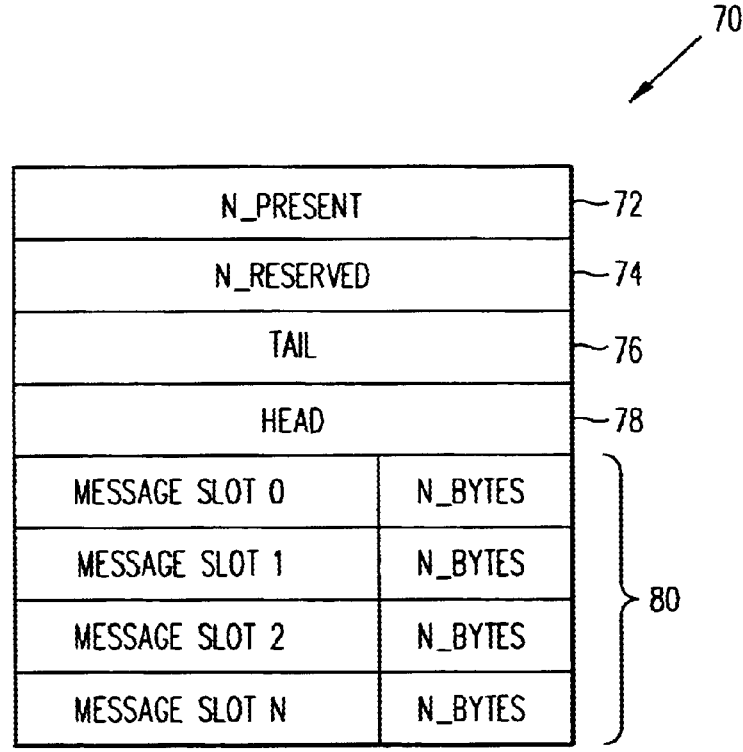
FIG. 5 is a block diagram of the mailbox data structure in the illustrative embodiment of the invention.

The pertinent fields of a mailbox data structure 70 in accordance with the invention are shown in FIG. 5. Fields 72, 74, 76, and 78 contain a set of indicators such as state variables that provide information on the status of data structure 70. (While these indicators in the illustrative embodiment are variables that refer to memory locations containing the indicated data, they may also be pointers or other objects that relate to the indicated data). Field 80 is an array of message slots for receiving and storing messages sent to the data structure (placed in the mailbox). The value of the variable n_present 72 indicates the number of slots filled with complete messages that are ready for receipt (received but unread). As described below, this indicator is examined to determine whether a received message is present in a message slot of the mailbox data structure for reading. The value of the variable n_reserved 74 indicates the number of slots either filled or currently filling. This indicator is examined to determine whether a message slot is available in the data structure for receiving a message. If n_reserved indicates that all slots are full, then the message is not sent to the data structure (not placed in the mailbox). The tail variable 76 is an index of the last message slot either partially or completely full (filling or full). It is used to determine the location of an available message slot for receiving a message. The head variable 78 is an index of the next slot containing either a complete or partially delivered message (in the latter case, the slot is currently filling). This indicator is examined to determine from which message slot to retrieve a received message.

Each message slot in field 80 contains storage sufficient to hold one message. The maximum size of a message is established when the mailbox is created, subject to an implementation-defined upper bound, and applies to all slots. In addition, each slot contains a state variable n_bytes indicating the size of the message contained therein, if any. The n_bytes variable can also contain one of two special values, "previously read" or "incomplete." These special values are greater than the implementation-defined maximum message size. The use of these special values is described below in Table 2, the pseudo code for receiving a message.

In the illustrative embodiment each mailbox has both an external name and an internal name. The external name of a mailbox is assigned at creation time and is a character string that consists of the node number (0, 1, . . . ) where the data structure is stored and a port number (also 0, 1, . . . ). Port numbers are integers that differentiate between mailbox data structures stored on the same node. The internal name is the virtual address within the address space of the calling process at which the mailbox data structure resides. As described below, a sending process first translates the external address of the mailbox data structure to its internal address and then sends the message to the mailbox data structure at its internal address. The use of external and internal addresses is an implementation detail, and other ways for identifying the mailbox data structures to sending processes are, of course, possible.

Resolving a Name

Once a mailbox data structure for a process is allocated and initialized, a sending process can proceed to send messages to that process via its mailbox. In the case of message-passing software, these processes are instances of the software residing on different nodes of system 10. Before sending a message, however, the sending instance first translates the external name of the receiving instance's mailbox data structure into the internal name. This translation is accomplished by calling a resolver function (FIG. 3, blocks 52 and 44) that performs the resolution. Typically all mailbox data structures are created upon application initialization so that the internal names are available when this function is called.

In the illustrative embodiment the resolver consists of a table that is directly indexed by the node and port number. Each entry in the table contains the internal name of a mailbox data structure if the corresponding mailbox exists or a unique value indicating that the mailbox does not exist. The embodiment computes an index from the external name (the node and port number) and then uses the index to look up the corresponding internal name. The resolver function returns this internal name to the calling instance Resolving a mailbox data structure's name in this fashion is not the only way for finding the location of a mailbox data structure. For example, locations of mailbox data structures may be stored with the names of their processes and looked up by process name.

Sending a Message

With the mailbox data structure for a destination process created and identified in some fashion, a sending process may send a message to the destination process via its mailbox data structure. Before sending a message to a mailbox data structure, however, a sending process must attach the shared memory region in which the data structure is stored to a suitable virtual address range within its own address space through means such as the shmat call. This attachment may occur when all mailbox data structures are created and initialized such as at application start-up time or at some other designated time. Other means may be used; the technique used is not important so long as a sending process attaches to the shared memory region containing the mailbox data structure to which it intends to send messages.

Table 1 contains pseudo code describing a function for sending a message in accordance with the invention. This function is invoked by a sending process such as an instance of message-passing software.

TABLE 1

```
Send_Message (destination_mailbox, content, n_bytes)
    old_n_reserved := AFADD (destination_mailbox.n_reserved, 1)
    if (old_n_reserved shows FULL)     (*No more slots are available.*)
        AFSUB (destination_mailbox.n_reserved, 1)    (*Correct it.*)
        return (MBOX_FULL_NO_SLOTS_ERROR)
    endif
    our_slot_index:=
        AFADD (destination_mailbox.tail, 1) modulo number_of_slots
    copy content to destination_mailbox.slot [our_slot_index] content
    (* the next operation must be implemented with a memory fence*)
    destination_mailbox.slot [our_slot_index] .size:=n_bytes
    AFADD (destination_mailbox.n_present, 1)
    return SUCCESS
done
```

The method of the Send_Message function places the message into the mailbox data structure of the destination process without the use of spin locks or any other mutual exclusion primitives. These primitives would otherwise block or impede the execution of any other processes concurrently sending messages to the same mailbox or of the (possibly concurrent) running receiver process of the mailbox as it reads previously-sent messages out of the mailbox. Instead, the method relies on an "exchange and add" (XADD) instruction or similar instruction found in data processors such as the Intel Pentium family of microprocessors. An atomic operation is considered or guaranteed to be indivisible (by analogy to an atom of matter, once thought to be indivisible), and thus a process executing an atomic instruction cannot be preempted until it finishes the execution. If the processor architecture does not support single atomic instructions that implement XADD directly, (as is the case in some Reduced Instruction Set Computing (RISC) architectures), then the common alternative implementation of XADD is a loop using a Locked-Load/Add/Store-Conditional instruction sequence that loops until the processor obtains exclusive ownership of the cache line containing the target memory value, updates the counter within, and then successfully writes back the modified cache-line containing the target memory value before any other processors in the system modify the same cache line. The atomic operation XADD is referred to in the pseudo code as AFADD( ) for atomic fetch and add, and AFSUB( ) for atomic fetch and subtract. The AFADD( ) operation returns the present value of a memory location and increments it to a new value while not permitting intervention by other processors of system 10. Similarly, the AFSUB( ) operation returns the present value of a memory location and decrements it to a new value while not permitting intervention by other processors of the system. In some uses, the present value returned by the instruction is used in the method while in other cases it is not used.

The illustrative embodiment also uses a "memory fence" operation. This operation ensures that any and all pending modifications to memory made by the processor performing the memory-fence operation are made visible to all other processors in system 10, before the invoking processor is allowed to issue any new write operations to the system's memory. This memory-write ordering requirement guarantees that the memory-writes made by the processor to place messages into the mailbox are complete before the size indicator n_bytes for the message slot is set to indicate the length of the now-delivered message. Without the memory fence operation in certain embodiments of the invention, the processor can buffer writes intended for the shared memory of a mailbox data structure and issue such buffered writes in an order that does not match the time-order in which the writes originally occurred. Furthermore, when a processor has messages in a set of buffered writes pending to a mailbox data structure, other processors in the system will not be aware of these pending writes. If a new value of n_bytes is placed in the mailbox data structure before the rest of the associated message, processors that are reading the data structure will read the old message stored therein rather than the new message in the buffered writes.

Figure 6:
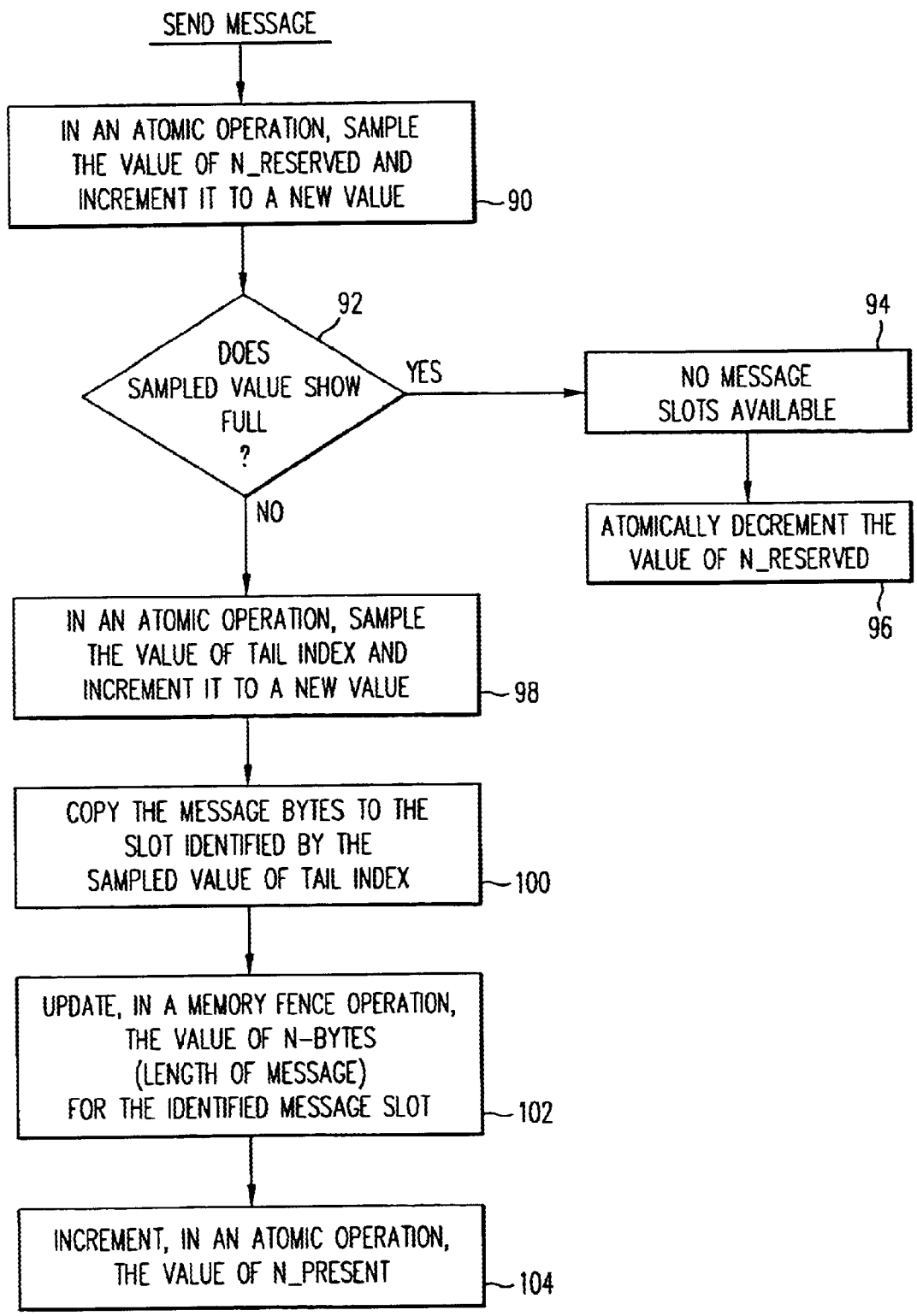
FIG. 6 is a flowchart of a method for sending a message from one process to another process in accordance with the invention.

FIG. 6 illustrates the method of sending a message in accordance with the invention to a mailbox data structure 70. To begin, the present value of the availability indicator for the destination mailbox data structure, n_reserved, is sampled and then changed (e.g., incremented) to a new value in an atomic operation (step 90). The original sampled value is then checked to see if it indicates that the mailbox data structure is full (step 92). If it is, then no message slots 80 are deemed available (step 94) and the value of n_reserved is atomically changed (e.g., decremented) (step 96) to undo the effects of the atomic sampling and increment performed in step 90. (The value of n_reserved cannot be trivially restored to its original value as multiple concurrent sender threads may all attempt to send a message to the full mailbox at the same time. Hence n_reserved must be atomically changed to undo the effects of step 90.)

If the present value of n_reserved does not show that the mailbox data structure is full (step 92), then the method proceeds to accept the message. The present value of the tail index is sampled and changed (e.g., incremented) to a new value in an atomic operation (step 98). Recall that the tail index is a location indicator that identifies the location of an available message slot in the mailbox data structure 70, such as message slot 2. The message to be sent is then deposited in the identified message slot such as by copying or otherwise moving the message to the slot (step 100). This sending of the message to the destination mailbox data structure is made visible to the multiple processors of system 10 in a memory fence operation that copies the value of n_bytes (the length of message indicator) to the identified message slot (step 102), such that all memory-write operations in step 100 are complete and visible to all processors before the n_bytes value is updated in the shared memory of system 10. The value of the presence indicator, n_present, is then changed to indicate that a message is present in a message slot of the destination mailbox data structure, waiting to be received (step 104).

Retrieving a Message

A message is retrieved by a destination process in the illustrative embodiment by making an appropriate function call, supplying with the call the name of the destination mailbox and retrieving the contents of the received message and its length value.

TABLE 2

```
Retrieve_Message (mailbox, content, n_bytes)
    if (mailbox.n_present = 0)      (*Nothing to receive.*)
            return FALSE
    endif
    loop through slots starting at mailbox.head,
    handling wrap-around via mailbox.head modulo number_of_slots:
            if (this slot's n_bytes <= MAX_MESSAGE_SIZE) then
                (*This slot contains a message.*)
                exit from loop
            endif
    end loop
    copy the message out to "content" and set n_bytes to its size
    if (the slot we found was the original mailbox.head) then
            (* We have read a message "in order."*)
            set this slot to "incomplete"
            freed := 1
            loop over succeeding slots, handling wrap-around via mailbox.head modulo
            number_of_slots:
                if (slot is not marked "previously read")
                    exit from loop
                        (*This slot is marked "incomplete" or contains a
                        message to read on the next call to this function.*)
                endif
                (*We have read message (s) out of order; clean up.*)
                set slot to "incomplete"
                freed := freed + 1
            end loop
            mailbox.head := (mailbox.head + freed) modulo number_of_slots
            AFSUB (n_present, freed)
            AFSUB (n_reserved, freed)
    else
            (*We have just read message "out of order."*)
            Set the slot to "previously read."   (*It will be cleaned eventually by the "loop
                over succeeding slots"*)
    endif
    return TRUE
done
```

Table 2 contains pseudo code describing the method of a message retrieving function in accordance with the invention.

Figure 7:
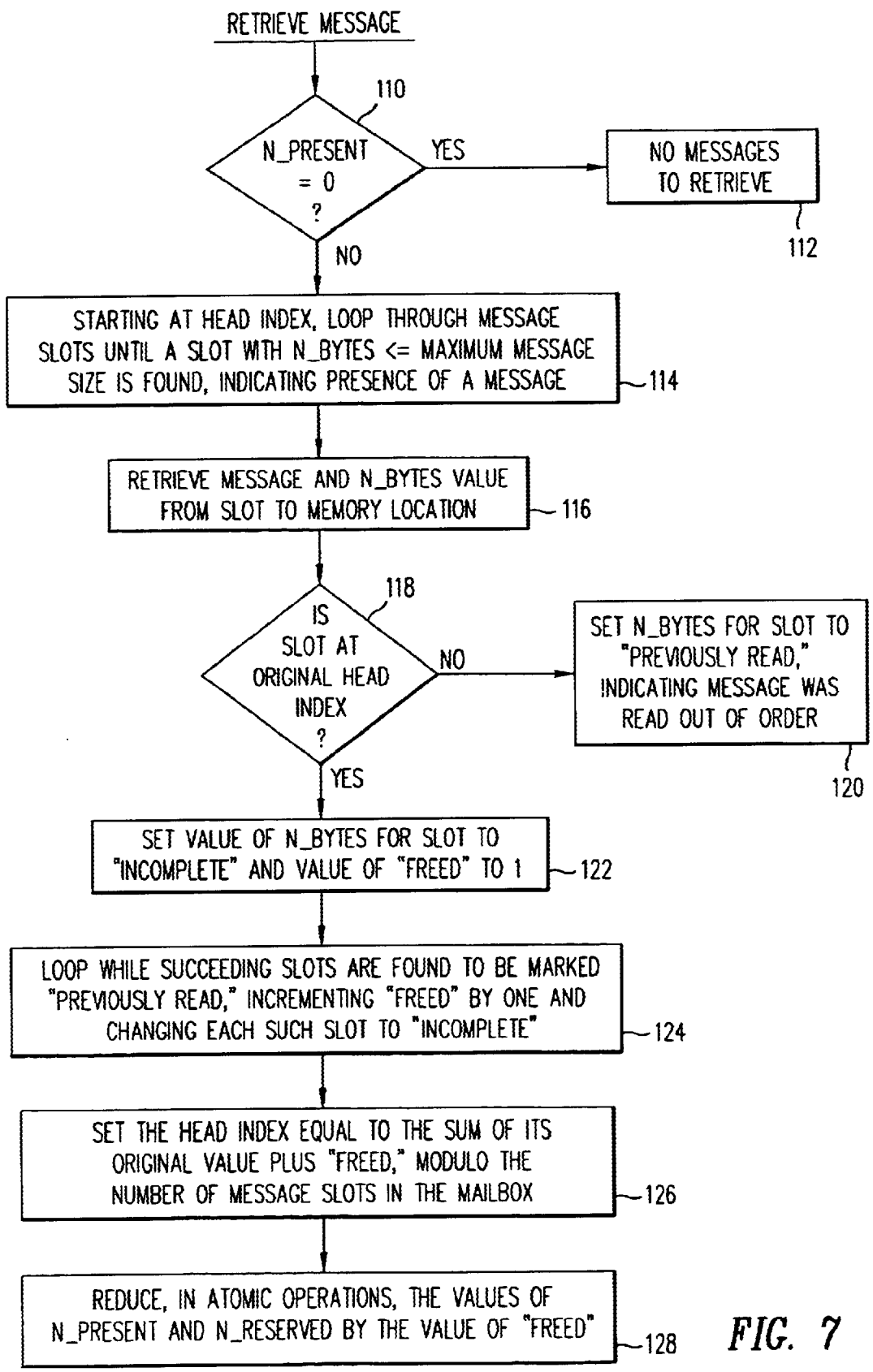
FIG. 7 is a flowchart of a method for receiving a message in accordance with the invention.

FIG. 7 illustrates this method of the illustrative embodiment for retrieving a message. To begin, the presence indicator, n_present, is checked to determine whether a received message is present in a message slot of the destination mailbox data structure (step 110). If the value of n_present is zero, then there are no messages in the data structure to retrieve (step 112). If n_present is non-zero, then the message slots starting at the one indicated by the head index are checked until one is found that has an n_bytes value (length of message) less than or equal to the maximum message size (step 114), indicating that a received message is present in the slot. The message is then retrieved from the slot by copying it and its message length value to a memory location outside of the mailbox data structure (step 116). The message has now been successfully retrieved by the destination process.

The method continues, however, to check whether the message just retrieved was retrieved out of order from the messages sent. The message slot is checked to determine if it is the one referred to by the head index (step 118). If not, then the message was retrieved out of order, and its n_bytes value is set to "previously read" to indicate this (step 120). But if the message slot is the one referred to by the head index, then its n_bytes value is set to "incomplete" and a "freed" variable is initialized to one (step 122). This step indicates that the message was retrieved in order from a message slot, and that the head index will be advanced at least one message slot. The remaining slots are then examined to change "previously read" designations to "incomplete" designations, incrementing the value of "freed" each time such a succeeding slot is found (step 124). As soon as the first slot is found that is not marked "previously read," the search for "previously read" slots terminates. The head index is then set equal to its original value plus the valued of "freed," with this quantity interpreted modulo the number of message slots in the mailbox (step 126). Finally, the values of the availability and present indicators, n_reserved and n_present, respectively, are changed (e.g., reduced) with atomic operations by the value of "freed" (step 128) to indicate that received messages have been retrieved from the mailbox data structure.

Having illustrated and described the principles of the invention in an exemplary embodiment, it should be apparent to those skilled in the art that the illustrative embodiment can be modified in arrangement and detail without departing from such principles. For example, the mailbox data structure can be implemented with any data structure capable of performing the described functions. Many of the software aspects of the embodiment may be implemented in hardware and many of the hardware aspects may be implemented in software. The invention can be implemented on a single processor or multiprocessor machine. In view of the many possible embodiments to which the principles of the invention may be applied, it should be understood that the illustrative embodiment is intended to teach these principles and is not intended to be a limitation on the scope of the invention defined in the following claims. We therefore claim as our invention all that comes within the scope and spirit of these claims and their equivalents.

We claim:

1. A method for communicating messages between processes via memory of a computer, the method comprising:
    providing a mailbox data structure for a second process in memory accessible to a first process and the second process, the data structure having one or more message slots for storing messages sent to the data structure, an availability indicator denoting a number of message slots that are at least partially filled and utilized to indicate if a message slot is available for receiving a message, a last message slot indicator denoting a last message slot that is at least partially filled and utilized to indicate a location of an available message slot for storing a message, a presence indicator denoting a number of message slots storing messages that have been received but that are unread and utilized to indicate whether a sent message has been received in a message slot, and a next-slot indicator denoting a next message slot that is at least partially filled and utilized to indicate a location of a slot containing a received message to be read; and sending a message from the first process to the second process via the mailbox data structure including:

obtaining, in an atomic operation, which is an operation that is indivisible and cannot be preempted, the present value of the availability indicator and changing the present value to a new value;

determining from the present value of the indicator if a message slot is available for receiving a message; and sending the message to the data structure if a message slot is available and changing, in an atomic operation, a value of the presence indicator to indicate that a message is present in a message slot the mailbox data structure.

2. The method of claim 1 wherein the computer is a distributed shared memory multiprocessor comprised of multiple nodes each with at least one processor and local memory, and the providing step comprises allocating shared memory for the mailbox data structure on a predetermined node associated with the second process.

3. The method of claim 2 wherein the second process is associated with an instance of message-passing software.

4. The method of claim 1 wherein the atomic operation comprises fetching the present value of the indicator, returning the present value, and incrementing the present value to the new value.

5. The method of claim 1 wherein the mailbox data structure includes a location indicator for indicating a location of an available slot, and the sending step includes:

obtaining, in an atomic operation, the present value of the location indicator to identify an available slot and changing the present value to a new value; and sending the message to the identified slot.

6. The method of claim 5 including making the sending of the message to the identified slot visible to all processors of the computer that execute processes for sending messages.

7. The method of claim 1 including:

determining from the presence indicator that a message is present in a message slot;

removing the message from the slot; and changing, in an atomic operation, the value of the presence indicator to indicate that the message is no longer present in the message slot.

8. The method of claim 7 including changing, in an atomic operation, the value of the availability indicator to indicate that a message slot is available.

9. A computer-readable medium on which is stored instructions of a computer program for executing the steps of claim 1.

10. The method of claim 1 including restoring, in an atomic operation, the value of the availability indicator to the present value if it is determined that a message slot is not available.

11. A mailbox data structure stored in a memory of a computer for communicating messages via memory between processes, the data structure comprising:

a set of message slots storing messages sent to the data structure; and a set of indicators manipulatable by an atomic operation, which is an operation that is indivisible and cannot be preempted, for inserting messages into and removing messages from the message slots, comprising:

a first variable denoting a number of message slots that are at least partially filled and utilized to indicate if a message slot is available for storing a message;

a second variable denoting a last message slot that is at least partially filled and utilized to indicate a location of an available message slot for storing a message;

a third variable denoting a number of message slots storing messages that have been received but that are unread and utilized to indicate whether a sent message has been received in a message slot; and, a fourth variable denoting a next message slot that is at least partially filled and utilized to indicate a location of a slot containing a received message to be read.

12. A computer-readable medium on which is stored the data structure of claim 11.

13. A multiprocessor computer with distributed shared memory, the computer comprising:

a multiple of nodes each with one or more processors and local memory;

a mailbox data structure stored in a local memory for communicating messages via shared memory between processes, the data structure comprising:

a set of message slots storing messages sent to the data structure;

an availability indicator denoting a number of message slots that are at least partially filled and utilized to indicate if a message slot is available for receiving a message;

a last message slot indicator denoting a last message slot that is at least partially filled and utilized to indicate a location of an available message slot for storing a message;

a presence indicator denoting a number of message slots storing messages that have been received but that are unread and utilized to indicate whether a sent message has been received in a message slot; and, a next-slot indicator denoting a next message slot that is at least partially filled and utilized to indicate a location of a slot containing a received message to be read; and a set of instructions stored in a computer-readable medium for sending a message to the mailbox data structure including:

obtaining, in an atomic operation, which is an operation that is indivisible and cannot be preempted, the present value of the availability indicator and changing the present value to a new value;

determining from the present value of the availability indicator if a message slot is available for receiving a message; and sending the message to the data structure if a message slot is available.

14. A method for communicating messages between processes via memory of a distributed shared memory multiprocessor computer, the computer having a multiple of nodes each with at least one processor and memory, the method comprising:

providing a mailbox data structure for a second process in the memory of a second node, the data structure having one or more message slots for storing messages sent to the data structure, an availability indicator denoting a number-of message slots that are at least partially filled and utilized to indicate if a message slot is available for receiving a message, a last message slot indicator denoting a last message slot that is at least partially filled and utilized to indicate a location of an available message slot for storing a message, a presence indicator denoting a number of message slots storing messages that have been received but that are unread and utilized to indicate whether a sent message has been received in a message slot, and a next-slot indicator denoting a next message slot that is at least partially filled and utilized to indicate a location of a slot containing a received message to be read; and sending a message from a first process on a first node to the second process on the second node via the mailbox data structure on the second node including:

in an atomic operation, which is an operation that is indivisible and cannot be preempted, obtaining the present value of the availability indicator and changing the present value to a new value;

determining from the present value of the indicator if a message slot is available for receiving a message; and sending the message to the data structure if a message slot is available and changing, in an atomic operation, a value of the presence indicator to indicate that a message is present in a message slot of the mailbox data structure.

15. A method for communicating messages between processes via a memory of a computer, the method comprising:

providing a mailbox data structure for a second process in memory accessible to a first process and the second process, the data structure having one or more message slots for storing messages sent to the data structure, an availability indicator denoting a number of message slots that are at least partially filled and utilized to indicate if a message slot is available for receiving a message, a last message slot indicator denoting a last message slot that is at least partially filled and utilized to indicate a location of an available message slot for storing a message, a presence indicator denoting a number of message slots storing messages that have been received but that are unread and utilized to indicate whether a message is present in a message slot and a next-slot indicator denoting a next message slot that is at least partially filled and utilized to indicate a location of a slot containing a received message to be read; and receiving a message sent from the first process to the second process via the mailbox data structure including:

determining from the presence indicator that a message is present in a message slot;

removing the message from the slot;

changing, in an atomic operation, which is an operation that is indivisible and cannot be preempted, the value of the presence indicator to indicate that the message is no longer present in the message slot; and, changing, in an atomic operation, the value of the availability indicator to indicate the message slot is now available for receiving a message.

16. The method of claim 15 wherein the mailbox data structure includes a location indicator for indicating the next slot containing a message to be retrieved, and the method includes advancing the location indicator past the message slot containing the message and past succeeding message slots containing messages previously read out of order.

17. A computer-readable medium on which is stored instructions of a computer program for executing the steps of claim 15.

\* \* \* \* \*